(12) United States Patent
Johnson et al.

(10) Patent No.: US 6,565,264 B1
(45) Date of Patent: May 20, 2003

(54) PIN AND SOCKET FIBER OPTIC TERMINI

(75) Inventors: Heath Allen Johnson, Bainbridge, NY (US); Gregory John Olesik, Otego, NY (US); John Henry Mikolaicyk, Oneonta, NY (US); David Otis Gallusser, Oneonta, NY (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 09/484,035

(22) Filed: Jan. 18, 2000

(51) Int. Cl.⁷ .................................................. G02B 6/36
(52) U.S. Cl. ............................ 385/78; 385/60; 385/72; 385/76
(58) Field of Search ........................ 385/58, 60, 76–78, 385/70–72

(56) References Cited

U.S. PATENT DOCUMENTS

| | | | |
|---|---|---|---|
| 4,789,218 A | 12/1988 | Paul et al. ................ | 350/96.21 |
| 4,812,007 A | 3/1989 | Lukas ...................... | 350/96.21 |
| 4,884,864 A | 12/1989 | Ellis et al. ............... | 350/96.21 |
| 4,892,379 A | 1/1990 | Takeda et al. ........... | 350/96.21 |
| 5,097,523 A | 3/1992 | Marie ...................... | 385/59 |
| 5,181,267 A | 1/1993 | Gerace et al. ............ | 385/86 |
| 5,201,019 A | 4/1993 | Gallusser et al. ......... | 385/99 |
| 5,283,848 A | 2/1994 | Abendschein et al. .... | 385/59 |
| 5,363,459 A | 11/1994 | Hultermans ............... | 385/60 |
| 5,432,879 A | 7/1995 | Lee .......................... | 385/60 |
| 5,469,521 A * | 11/1995 | Coutts et al. ............. | 385/77 |
| 5,581,645 A | 12/1996 | Gehri ........................ | 385/78 |
| 5,608,828 A | 3/1997 | Coutts et al. ............. | 385/59 |
| 5,781,674 A | 7/1998 | Asai ......................... | 385/78 |
| 5,862,282 A | 1/1999 | Matsuura et al. ......... | 385/86 |
| 5,930,427 A * | 7/1999 | Parker ....................... | 385/60 |
| 6,254,283 B1 * | 7/2001 | Novacoski et al. ........ | 385/78 |

* cited by examiner

Primary Examiner—John D. Lee
Assistant Examiner—Sarah U Song
(74) Attorney, Agent, or Firm—Blank Rome LLP

(57) ABSTRACT

A termination arrangement for fiber optic cables includes a precision ceramic guide press fit into a sleeve on both the socket and pin termini. The precision ceramic guide of the socket terminus is extended through a bushing and alignment sleeve, and a compression spring is positioned between the bushing and a stepped washer secured in the connector so that the bushing, sleeve, and precision ceramic guide may all be moved relative to the stepped washer upon insertion of the ceramic guide of the pin terminus into the alignment sleeve. The length of each terminus is chosen so that any grommet on an environmentally sealed connector will always fall on a portion of the body which has the same diameter for each terminus so that one grommet can be used with a variety of different size cables. A rear section of both the pin and socket terminus bodies are stepped down to provide an area for the strength member of the fiber optic cable to be terminated to. By applying epoxy to the stepped down diameter of the rear bodies and the fiber optic cable jacketing, the strength member can be evenly distributed over the rear of the bodies and a shrink tube can be brought up over the outer jacketing of the fiber optic cable to the appropriate position and shrunk down in order to cure the epoxy, captivate the strength member, and seal the shrink tube to the fiber optic cable jacketing. The sleeve may alternatively be extended through the stepped washer and terminate in a threaded portion onto which the bushing may be threaded, the precision ceramic guide being press fit into the bushing rather than the sleeve so as to minimize the length of the hole that must be produced in the precision ceramic guide.

16 Claims, 3 Drawing Sheets

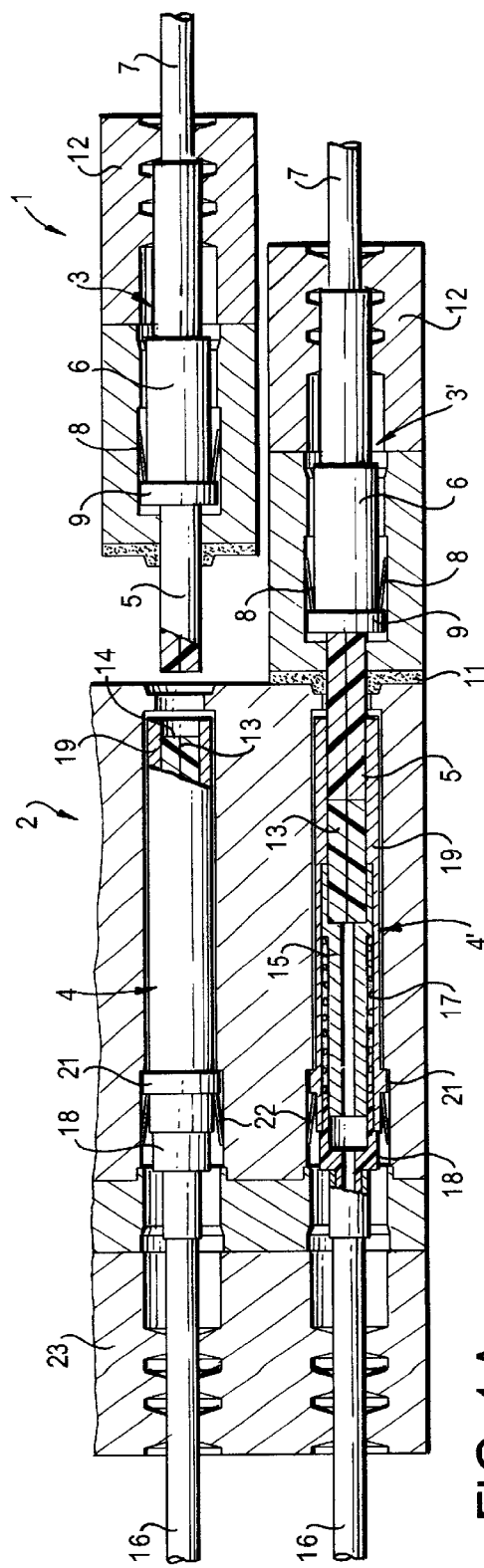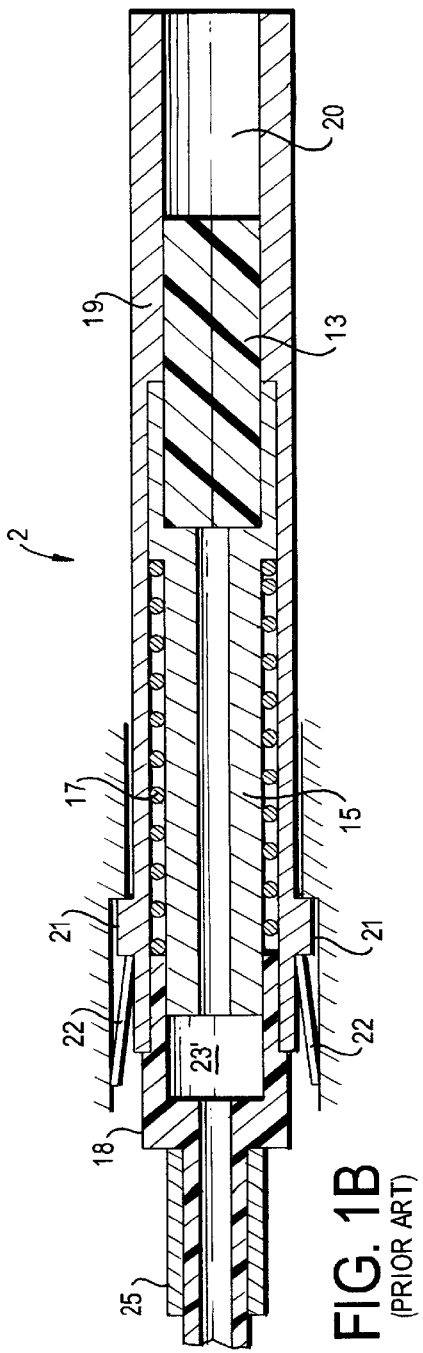
FIG. 1A (PRIOR ART)
FIG. 1B (PRIOR ART)

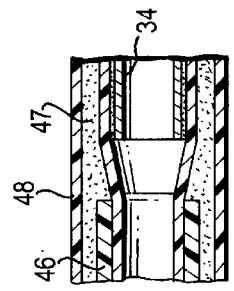
FIG. 3
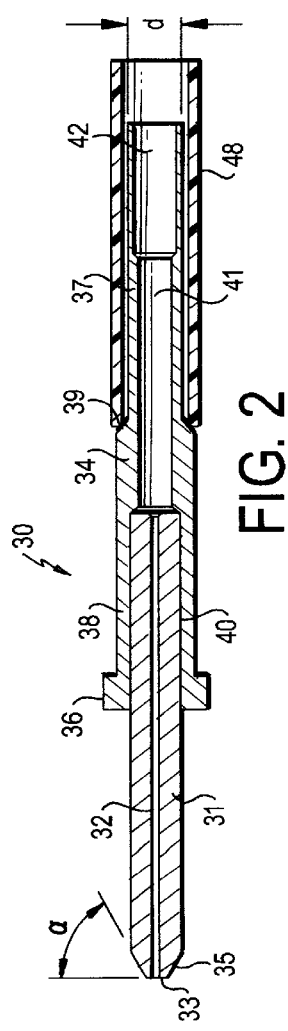
FIG. 2
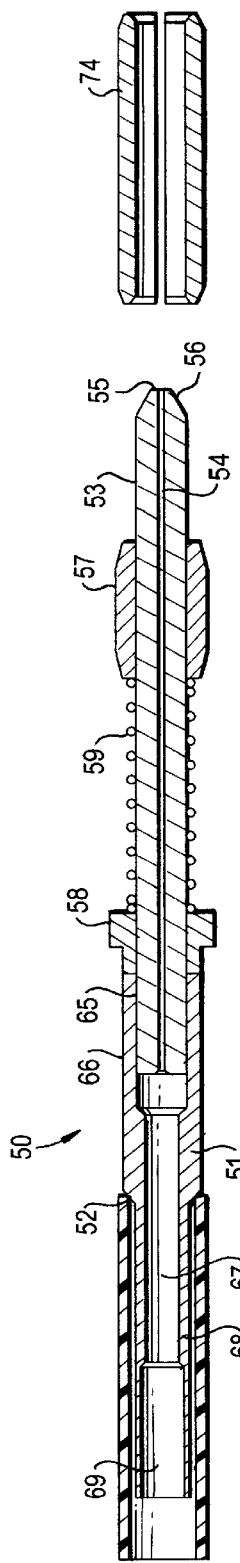
FIG. 5
FIG. 4
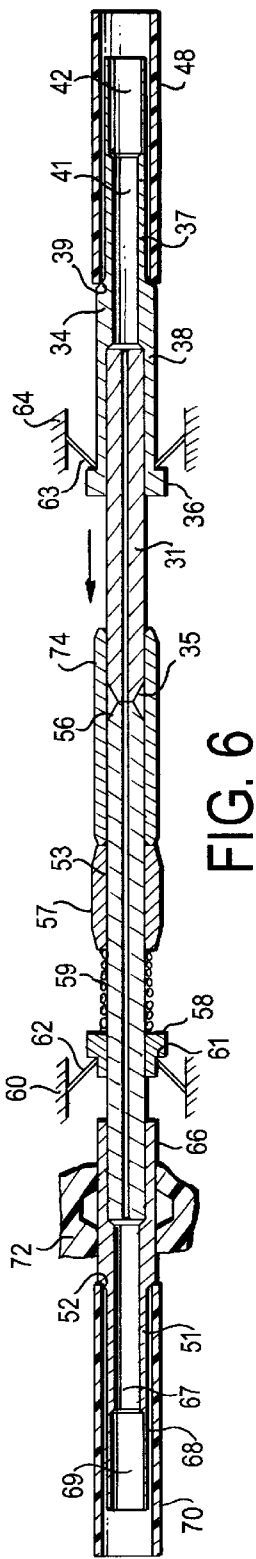
FIG. 6

PIN AND SOCKET FIBER OPTIC TERMINI

BACKGROUND OF THE INVENTION

1. Field of the Invention

The present invention generally relates to fiber optic termini, and more particularly to pin and socket fiber optic termini. By pin and socket termini is meant termini of the type in which a pair of optical fibers are connected by installing each fiber in a hole in a precision ferrule, and positioning the ferrules in alignment with their tips abutting. A first or socket ferrule lies in the rear half of an alignment sleeve of a socket connector, and a pin connector is mated to the socket connector by projecting the pin ferrule into the sleeve until the tips of the ferrules abut, the socket ferrule being spring biased forwardly so it can deflect rearwardly.

In addition to relating to improved pin and socket termini, the present invention relates to a method of terminating fiber optic cables to fiber optic termini.

2. Description of the Related Art

Pin and socket fiber optic termini of the type in which a pair of optical fibers are connected by installing each fiber in a hole in a precision ferrule, and positioning the ferrules in alignment with their tips abutting, are well known and widely used. However, conventional pin and socket fiber optic termini have a number of limitations which makes them impractical for use in couplers requiring a terminus size of less than size 16. The present invention is directed to the following improvements to the conventional pin and socket fiber optic termini, which are intended to simplify manufacture and thereby enable production of smaller termini: (i) re-design of the holders or retention sleeves, precision ceramic guides, and biasing arrangements for the termini to permit the holders and guides to be press-fit together, avoiding the need to use adhesives or laser welds during assembling of the terminus structures (although adhesives may still be used during termination of the fiber optic cables to the pin and socket termini); (ii) re-design of the portion of the termini to which the strength members of the cable are terminated, simplifying the termination procedure and providing a more secure termination; (iii) including features that facilitate replacement of parts, cleaning and polishing of the mating faces of the precision guides or ferrules after a cable has been terminated thereto, and formation of a good environmental seal at the ingress of the terminated cable into a pin and socket coupler.

FIGS. 1A and 1B illustrate a conventional pin and socket fiber optic connector system. The conventional termination arrangement includes a pin connector 1 and a socket connector 2 arranged to accommodate a plurality of pin termini 3,3' and socket termini 4,4'. Pin termini 3,3' and socket termini 4,4' are arranged so that the pin and socket connectors can conveniently be mated by simply inserting ends of the pin termini 3,3' into openings in the socket termini 4,4' and then securing the pin connector 1 to the socket connector 2 using any of a variety of known coupling means (not shown). Examples of known types of coupling means that can be used in connection with pin and socket fiber optic termination arrangements of the illustrated type include threaded coupling nuts and bayonet-type coupling arrangements.

One of the pin termini 3 of the connector system of FIG. 1A is shown prior to mating and another of the pin termini 3' is shown in a mated position. Each pin terminus includes a ceramic guide 5 for precisely locating an optical fiber, and a guide holder 6, conventionally made of stainless steel, for holding the ceramic guide. The retention sleeve 6 is conventionally secured to the precision guide by adhesives or welding, and includes an integral rear ferrule to which the strength member and/or jacket of the cable is terminated after being stripped back from the fiber, and after insertion of the fiber through the retention sleeve 6 into the precision guide 5. The completed pin termini are mechanically held in the pin connector 1 by retention tines 8 that engage a collar 9 on the retention sleeve, and the coupler is completed by the inclusion of a sealing gasket 11 at the mating interface of the pin coupler, and a sealing grommet 12 that engages the rear of the retention sleeve 6 and cable jacket 7 extending therefrom to prevent ingress of moisture or dust into the coupler.

The socket termini 4,4', shown in greater detail in FIG. 1B, also include precision ceramic guides 13 and guide retention sleeves 15 to which strength members and/or jackets 16 of the fiber optic cables are terminated, and in addition includes an arrangement for biasing the retention sleeve 15 and guide 13 of respective socket termini 4,4' against the retention sleeve 6 and guide 5 of corresponding pin termini 3,3'. Furthermore, the socket termini 4,4' each includes a biasing arrangement in the form of a compression spring 17 that engages a rear of the corresponding retention sleeve 15 and is captured between the retention sleeve 15 and a rear ferrule or cap 18 to which the cable is terminated. Rear ferrule 18 is secured, through use of an adhesive or welding, to an alignment sleeve 19 which axially aligns the ceramic guides of the pin and socket connectors, and which surrounds the retention sleeve 15 to guide the retention sleeve while permitting axial movement of the retention sleeve during mating.

An opening 20 in the alignment sleeve serves as the socket opening for receiving corresponding precision guide 5 of one of the pin termini 3,3'. The socket termini 2 are secured in the socket connector, in the illustrated connector system, by engagement between a collar 21 on the alignment sleeve 19, and retention tines 22 similar to the corresponding retention tines of the pin connector, although it is also possible to arrange the rear ferrule 18 to engage the retention tines. At the rear of retention sleeve 15 is a space 23' that permits movement of guide 13 and retention sleeve 15 in a rearward direction against the bias provided by spring 17 in response to insertion of guide 5 into alignment sleeve 19. Conventionally, the strength member of the cable is secured to a rear portion of rear ferrule member 18 by crimp ferrule 25, and a sealing rear grommet 23 corresponding to sealing grommet 12 is provided at the rear of the socket connector 2 to complete the connector system.

As mentioned above, the design illustrated in FIG. 1, as well as other similar pin and socket fiber optic termination designs, are impractical for terminus sizes of less than 16. One reason is that the precision ceramic guide and guide retention sleeve of the conventional pin and socket termini (or the alignment sleeve and rear ferrule or cap of the conventional socket terminus), must be secured to each other through use of adhesives or precision welding techniques. The design of the socket terminus, in particular, necessitates the use of adhesives or welding because of the manner in which the bias spring is captured within the alignment sleeve. This use of adhesives or welding becomes increasingly difficult to carry out as the terminus size is decreased, resulting in increased assembly costs and likelihood of errors. Furthermore, once the rear ferrule is adhered or welded to the alignment sleeve, non-destructive removal of the precision guide from the assembly is impossible. As a result, should an error occur during assembly or cable termination, or should one of the parts of the terminus prove defective, the entire terminus must be discarded, further increasing costs.

A second problem that arises in smaller fiber optic terminations is that a smaller termination area for the cable strength member makes termination of the cable to the terminus difficult. Conventional designs do not leave sufficient room to provide a secure mechanical termination of the strength member to the rear of the guide retention sleeve in the pin termination, or to the rear of the rear ferrule in the socket termination, and the strength member itself may be too weak in a smaller cable to ensure that the cable is secured to the terminus while relieving stress on the optical fiber.

Additional problems with smaller size terminations include (i) difficulties in achieving an effective seal between the cable jacket and the rear sealing grommet, as a result of tolerances in the cable jacket, (ii) difficulties in maintaining a clean interface once the optical fiber is terminated to the precision guide, and (iii) in the case of single mode fiber terminations, difficulties in producing holes of sufficient length in the precision ceramic guides that hold the fibers.

SUMMARY OF THE INVENTION

It is accordingly a first objective of the invention to provide a pin and socket fiber optic termination system, in which the size of the termini may be made smaller than is practical for conventional fiber optic termini.

It is a second objective of the invention to provide fiber optic termini of the type including ceramic guides, retention sleeves, and a compression spring for biasing the retention sleeve and guide into a mating position, in which the ceramic guide, retention sleeve, and compression spring may be press-fit to each other without requiring laser welding or adhesives to secure the parts together during fabrication of the termini prior to termination of a cable.

It is a third objective of the invention to simplify termination of fiber optic cables to pin and socket termini and yet to improve the integrity of the resulting termination.

It is a fourth objective of the invention to provide a fiber guide assembly that can easily be removed and as necessary replaced up to the time a fiber optic cable has been terminated thereto.

It is a fifth objective of the invention to provide a fiber optic terminus which requires less frequent cleaning, and which has a relatively smaller diameter end face, enabling faster polishing times for a bonded in fiber.

It is a sixth objective of the invention to provide a fiber optic terminus designed to ensure that the rear grommet of an environmentally sealed connector will always seal on a consistent diameter and not be cable dependent.

It is a seventh objective of the invention to provide a guide assembly for a single mode fiber that provides an extended terminus while minimizing the length of the hole that must be produced in the ceramic guide.

It is an eighth objective of the invention to provide a multimode or single mode fiber optic cable termination arrangement that is simple in structure, reliable, and yet smaller than conventional fiber optic termini, capable for example of fitting into a size 20 pin and socket cavity within a connector.

These objectives of the invention are achieved, in accordance with the principles of a first preferred embodiment of the invention, by providing a fiber optic connector system and a termination arrangement for fiber optic cables in which the retention sleeve for the precision ceramic guides of the pin and socket terminations is arranged to receive and be secured to the precision ceramic guides solely by press-fitting, without the need for adhesives or welding. Both the pin terminus and socket terminus of this preferred embodiment include extended ceramic guides and guide retention sleeves, the socket terminus including a bushing and a stepped washer to capture the bias spring and retain it directly on the precision ceramic guide. Each of the retention sleeves of the pin and socket termini include precision angled steps arranged to facilitate press fitting of the guide retention sleeves to their respective guides and to make insertion of the terminus insertion/removal tool easier when using the smallest size fiber optic cable.

The structure of the termini of this embodiment has at least the following advantages: (i) positioning of the bias spring on the precision ceramic guide minimizes the radius of the socket terminus, (ii) addition of the stepped washer eliminates the need for capturing the bias spring by using adhesives to secure a conventional rear ferrule or cap to the retention sleeve or alignment sleeve, and allows the retention sleeve to move with the cable so that the cable can be directly terminated to the retention sleeve, (iii) the inclusion in the washer of a step prevents the retention mechanism of the connector from being deflected beyond the elastic limit of its material, and (iv) the sleeve is designed so that the grommet of the connector will always seal on the consistent diameter of the sleeve and not be cable dependent.

Due to the close tolerances, the frictional forces between the alignment sleeve and the guides causes the sleeve to stay on the socket terminus when the termini are disconnected and yet it is still easy to remove the sleeve for cleaning the front face of the guide. In addition, each guide member also has a long chamfer at one end which minimizes the size of the front face for faster polishing and which minimizes contamination of the front face by particles which may be sheared off of the alignment sleeve during assembly, and the length of each terminus may be chosen so that any grommet on an environmentally sealed connector will always fall on a portion of the body which has the same diameter for each terminus so that one grommet can be used with a variety of different size cables.

In accordance with the principles of a second preferred embodiment of the invention which is especially suitable for use with single mode optical fibers, which require a smaller core diameter for the precision hole than multimode optical fibers and therefore present additional tolerance/size problems, the guide retention sleeve is extended through the stepped washer and terminates in a threaded portion onto which the bushing may be threaded, the precision ceramic guide being press fit into the bushing rather than the sleeve so as to minimize the length of the hole that must be produced in the precision ceramic.

Like the termination arrangement of the first preferred embodiment of the invention, the retention sleeves of the termination arrangement of the second preferred embodiment of the invention provide the following advantages: (i) positioning of the bias spring on the retention sleeve (behind the ceramic guide) minimizes the radius of the socket terminus, (ii) addition of the stepped washer eliminates the need for capturing the bias spring by using adhesives to secure a conventional rear ferrule or cap to the retention sleeve or alignment sleeve, and allows the retention sleeve to move with the cable so that the cable can be directly terminated to the retention sleeve, (iii) the inclusion in the washer of a step prevents the retention mechanism of the connector from being deflected beyond the elastic limit of its material, and (iv) the sleeve is designed so that the grommet of the connector will always seal on the consistent diameter of the sleeve and not be cable dependent.

In addition to providing improved termini structure suitable for use with single mode and multimode optical fibers, the preferred embodiments of the invention share an improved arrangement for terminating the strength members of the cables to the termini, the method of termination also constituting part of the claimed invention. This method involves stripping the cable jacket from the strength member, fitting the strength member over a reduced diameter portion of the retention sleeves for the precision ceramic guides, coating the reduced diameter portion of the retention sleeves and a portion of the cable jacket with epoxy, surrounding the epoxy coating with a heat shrink sleeve, and applying heat to the assembly in order to cure the epoxy and complete the termination. By applying epoxy to the stepped down diameter of the rear bodies and the fiber optic cable jacketing, the strength member can be evenly distributed over the rear of the bodies and the shrink tube can be brought up over the outer jacketing of the fiber optic cable to the appropriate position and shrunk down in order to cure the epoxy, captivate the strength member, and seal the shrink tube to the fiber optic cable jacketing.

In an especially preferred embodiment of the invention, the heat shrink tube is made of an at least partially transparent material so as to provide a visual indication as to when the epoxy has changed color, thereby indicating whether the epoxy is fully cured.

As a result of the various improvements to the conventional pin and socket fiber optic connector provided by the above-described preferred embodiment of the invention, the size of fiber optic pin and socket termini can in practice easily be reduced from size 16 to size 20 and smaller. Nevertheless, even though the invention facilitates manufacture and use of smaller fiber optic termini, the scope of the invention should not be limited to size 20 and smaller termini. Instead, it is intended to encompass any size of fiber optic termini, for which the invention may offer improved reliability and ease-of-manufacture apart from the advantages of miniaturization.

BRIEF DESCRIPTION OF THE DRAWINGS

FIG. 1A is a cross-sectional side view of a typical conventional pin and socket termination arrangement.

FIG. 1B is a cross-sectional side view showing details of the socket terminus included in the pin and.socket termination arrangement illustrated in FIG. 1A.

FIG. 2 is a cross-sectional side view of a pin terminus constructed in accordance with the principles of a first preferred embodiment of the invention.

FIG. 3 is a cross-sectional side view showing the manner in which a fiber optic cable is terminated to the termini of the first preferred embodiment.

FIG. 4 is a cross-sectional side view of a socket terminus of the first preferred embodiment.

FIG. 5 is a cross-sectional side view of an alignment sleeve for the first preferred embodiment.

FIG. 6 is a cross-sectional side view illustrating the manner in which the socket terminus of the first preferred embodiment moves relative to a connector and stepped washer during mating.

DETAILED DESCRIPTION OF THE PREFERRED EMBODIMENTS

Figure 7:
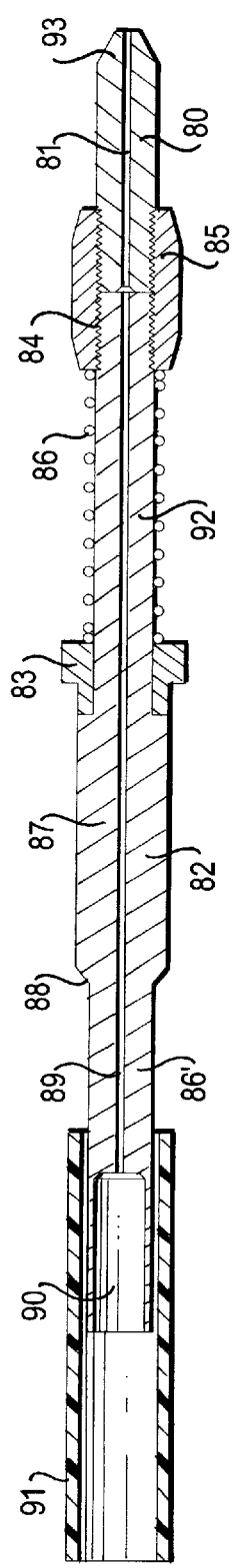
FIGS. 7–9 respectively show a socket terminus, an alignment sleeve, and a pin terminus, constructed in accordance with the principles of a second preferred embodiment of the invention.

The pin and socket termini of the preferred embodiments of the invention are designed to be used in pin and socket connectors 1 and 2 having a standard configuration, such as the one illustrated in FIGS. 1A and 1B, replacing termini 3 and 4, although the connectors may be modified to accommodate smaller size termini. On the other hand, while the termini design of the preferred embodiments is intended to permit the manufacture of smaller termini, it will be appreciated by those skilled in the art that the principles of the invention may also be applied to larger size fiber optic pin and socket termini.

As illustrated in FIG. 2, the pin terminus 30 of a first preferred embodiment of the invention includes a precision guide or alignment ferrule 31 having a longitudinal passage 32 for receiving an optical fiber (not shown) of a fiber optic cable. The optical fiber in this embodiment is preferably a multimode optical fiber, which is inserted into the precision guide during termination of a cable, trimmed, and polished to be flush with a mating front surface 33 of the guide. As is conventional, before insertion of the optical fiber, the precision guide is secured to a retention sleeve 34, but instead of being secured by adhesive or welding, the invention permits the precision ceramic guide to be secured solely by press-fitting so that it can be removed if necessary at any time before termination of the cable.

Precision ceramic guide 31 is preferably made of a ceramic material and differs from conventional ceramic guides in that a relatively large chamfer 35 is provided at the front surface 33 of the guide so that particles worn off the alignment sleeve have a longer path to travel to get to the all important fiber area of the terminus. By relatively large is meant a chamfer at an angle $\alpha$ of at least approximately 45°. Provision of a relatively large chamfer reduces the frequency at which the fiber face needs to be cleaned. In addition, the decreased fiber-to-ceramic ratio at the end face of the guides requires less polishing time and allows for less undercut and a physical contact to be employed between a mated pair with a flat to convex polish, resulting in lower losses and reflections.

Retention sleeve 34 may be made of stainless steel or a similar dimensionally stable, easily machined material, and includes a collar or flange 36 arranged to engage retention elements such as retention elements 8 of the connector shown in FIG. 1, so that the pin terminus can be inserted into and retained in a corresponding connector in the same manner as the conventional pin terminus. However, as illustrated, sleeve 34 differs from the conventional sleeve in that a rear section 37 of the sleeve has a reduced diameter relative to the front section 38, the front and rear sections being separated by a precision angled step 39.

Retention sleeve 34 of the pin terminus also includes a bore 40 extending into front section 38 of the retention sleeve, and into which the precision guide is press-fit. Communicating with bore 40 is a central bore 41 extending into rear section 37 of the retention sleeve 34 and dimensioned to receive a buffer or cladding portion of the cable. Also included in rear section 37 is a rear bore 42 which communicates with central bore 41 and has an enlarged diameter to facilitate insertion of the stripped buffer into the retention sleeve during termination of the cable.

As in conventional guide retention sleeves or sleeves, the strength member of the cable is terminated to the exterior of the rear section. However, unlike conventional ceramic guide retention sleeves, when the strength member is fitted over the rear portion 37 of the retention sleeve 34 of the preferred embodiment of the invention, the outer diameter d of the strength member is approximately equal to that of the cable jacket, which has been stripped to a point just before the end of the sleeve. As a result, not only the strength member, but also a portion of the cable jacket can be captivated during termination to provide a more secure termination having a diameter that is less than that of the conventional crimp termination.

Although it is possible to use a crimp ferrule or other conventional termination with the retention sleeve structure of the preferred embodiment, termination is preferably carried out by the following method: After preparation of the cable by stripping the cladding, strength member, and jacket to appropriate lengths and inserting the stripped fiber and cladding through the retention sleeve 34 into the guide 31 so that a length of fiber extends from the mating face 33 of the guide, the outside diameter of rear section 37, and cable jacket 46 are coated with a layer of epoxy 47, a heat shrink tube 48 which has previously been fitted over the cable is positioned over the layer of epoxy. The assembly is then heated, curing the epoxy and causing the heat shrink tube 48 to shrink, with excess epoxy being forced out of the tube along the precision angled step and cable jacket. The result is an especially secure attachment of the strength member to the retention sleeve 34. The resulting cable termination arrangement is best illustrated in FIG. 3.

In an especially advantageous implementation of the above-described method, the heat shrink tube 48 is made of an at least partially transparent material. Appropriate materials are currently commercially available. Use of a clear heat shrink tube permits the epoxy to be viewed to determine whether it has been cured based on changes in the color of the epoxy.

The socket terminus 50 for the first preferred embodiment of the invention also includes a precision ceramic guide retention sleeve 51 made of a dimensionally stable material such as stainless steel and having a precision angled step 52. Precision ceramic guide 53 of the socket terminus 50 is press fit into retention sleeve 51 in the same manner as ceramic guide 31 is press fit into retention sleeve 34, and is preferably made of the same ceramic material, including a central passage 54 for the optical fiber and a mating face 55 having a large chamfer 56 which may be identical to the chamfer 35 of the pin terminus sleeve.

Unlike ceramic guide 31 of the pin terminus, however, ceramic guide 53 of the socket terminus 50 has an extended length so as to also be press fit into a stainless steel bushing 57, which captivates a stepped washer 58 and compression spring 59. Because compression spring 59 may thus be positioned directly on the ceramic guide 53, the radius of the socket terminus is minimized, while the inclusion of the stepped washer 58 eliminates the need for capturing the compression spring by using adhesives to secure a conventional rear ferrule or cap to the retention sleeve or alignment sleeve, and allows the retention sleeve to move with the cable so that the cable can be directly terminated to the retention sleeve 51. In addition, the extended length of the ceramic guide 53 provides increased rigidity to the assembly and a more tightly toleranced outside diameter to justify the press fitting.

The stepped washer 58 is used to retain the socket terminus in its respective connector 60 by engagement of shoulder 61 with a retention mechanism represented by tines 62. The step in the washer prevents the tines 62 from being deflected beyond their elastic limit as the socket terminus retracts to its fully mated position as a result of the step having the same diameter as the rear of the socket terminus. Those skilled in the art will appreciate that the stepped washer thus serves a function similar to collar 36 of retention sleeve 34 in the pin terminus 30, which engages retention tines 63 of a pin connector 64, but that because the stepped washer 58 is movable relative to the retention sleeve 51, guide 53, and bushing 57 are all axially movable against the bias force provided by compression spring 59 in response to engagement of mating face 55 of guide 53 with mating face 33 of guide 31, the mating force overcoming any friction between washer 58 and guide 53, and between alignment sleeve 74 and guide 31.

When used in fiber optic pin and socket connectors having rear sealing grommets similar to those shown in FIGS. 1A and 1B, the length of the retention sleeves 34 and 51, and of the guides 31 and 53, ensures that the grommets 72 (only one of which is shown) at the rear of the connectors will always seal on a consistent diameter, particularly with respect to the socket terminus which is moved rearwardly in the connector upon mating, the spring force provided by compression spring 59 being selected to overcome frictional forces between the rear of the terminus and the rear grommet 72 of the environmentally sealed connector it is installed in, thereby returning the socket terminus to its original position, shown in FIG. 4, when the connectors are unmated.

Because of the presence of stepped washer 58, it is of course not necessary to include a collar on retention sleeve 51. Otherwise, however, retention sleeve 51 is similar to retention sleeve 34 and includes a bore 65 extending into front section 66 of the retention sleeve, and into which the precision guide is press-fit. Communicating with bore 65 is a central bore 67 extending into rear section 68 of the retention sleeve and dimensioned to receive a buffer or cladding portion of the cable. Also included in rear section 68 is a rear bore 69 which communicates with central bore 66 and has an enlarged diameter to facilitate insertion of the stripped buffer into the retention sleeve during termination of the cable. As in the pin terminus 30, rear section 68 provides a surface to which the strength member of the cable may be secured using the method described above, involving positioning of the strength member around the rear section 68, coating the outside diameter of rear section 68 and cable jacket with epoxy, and applying heat to cure the epoxy and cause shrinkage of a heat shrink tube 70.

Finally, in the first preferred embodiment of the invention, the pin and socket termini are aligned to one another by means of a slotted alignment sleeve 74 fitted on the socket terminus. Alignment sleeve 74 may be made of either plastic, metal, or ceramic, and is arranged to be held onto the ceramic guide 53 of the socket terminus 50 by friction. Preferably, the frictional force should be sufficient to hold the sleeve 74 on the guide 53 even when subject to frictional forces from the rear sealing grommet 72 of the environmentally sealed connector 60, while still permitting the sleeve to easily be installed or removed by hand to aid in cleaning of the ceramic tip that includes mating interface 55 and that will eventually house a bonded-in fiber.

FIG. 7 shows a variation of the socket terminus of FIG. 4 arranged to hold a single mode rather than a multimode fiber. It is identical to the socket terminus of FIG. 4 except that the precision ceramic guide 80 is modified to include a tighter toleranced diameter central passage 81 for the single mode optical fiber, the guide retention sleeve is replaced by a sleeve 82 which is extended forwardly of the stepped washer 83 and includes an externally threaded front portion 84, the bushing 85 includes an internally threaded portion that permits the bushing to be threaded onto the front portion 84 of the sleeve 82, and the ceramic guide 80 is press fit into the bushing 85 rather than into the sleeve. As in the socket terminus of the first preferred embodiment, a compression spring 86 extends between the stepped washer 83 and the bushing 85, and the rear portion 86' of the sleeve 82 which is separated from a central portion 87 by a precision angled step 88 that facilitates the insertion of the insertion/removal tool when using the smallest size fiber optic cable. Sleeve 82 includes communicating central bores 89 and 90 arranged to accommodate stripped portions of the cable inserted therethrough, the strength member of the cable being fitted over rear portion 86' of sleeve 82 and captured by heat shrink sleeve 91, which extends to the rear of the sleeve so as to also enclose a jacket of the cable.

The reason for using a threaded guide assembly is that it permits use of a drawn stainless steel tube section 92 and relatively short precision ceramic guide 80 in place of the extended ceramic guide of the first preferred embodiment of the invention. The small diameter of the single mode fiber makes manufacturing difficult, particularly in view of the relatively long length of the guide hole or passage, and thus the tube section 92 is included to provide a less expensive way of getting the fiber to the chamfered tip 93 of the precision ceramic guide. The use of a threaded guide assembly still permits the guide to be removed and replaced with another guide at any time up until a fiber optic cable has been terminated to it.

It will of course be appreciated by those skilled in the art that the threaded guide of the embodiment shown in FIG. 7 may also be used for a multimode fiber by modifying the central interior passages of the sleeve 82 and guide 80, and that under certain circumstances it might be possible to use the extended precision ceramic guide of FIG. 4 in the context of a single mode fiber optic cable.

Figure 8:
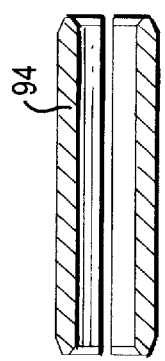
Figure 9:
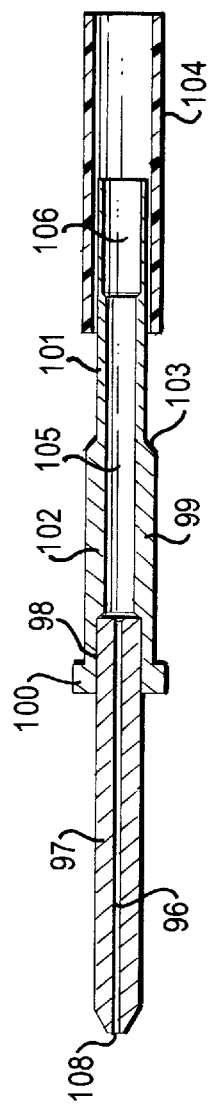

The alignment sleeve 94 and pin terminus 95 corresponding to the socket terminus of FIG. 7 and respectively shown in FIGS. 8 and 9 are identical to the corresponding alignment sleeve and pin terminus shown in FIGS. 5 and 2, except for modifications to the central passage 96 of precision ceramic guide 97 to accommodate the single mode fiber, shortening of ceramic guide 97, and shortening of bore 98 of guide retention sleeve or sleeve 99. As in the first preferred embodiment of the invention, precision ceramic guide 97 is preferably made of a ceramic material and includes a relatively large chamfer 108 so that particles worn off the alignment sleeve have a longer path to travel to get to the all important fiber area of the terminus. In addition, retention sleeve or sleeve 99 may be made of stainless steel or a similar dimensionally stable, easily machined material, and includes a collar or flange 100 arranged to engage retention elements of a corresponding pin connector. Again, a rear portion 101 of the retention sleeve has a reduced diameter relative to the front section 102, the front and rear sections being separated by a precision angled step 103 to facilitate press fitting the guide retention sleeve 102 to its respective guide 97 and to make insertion of the terminus insertion/removal tool easier when using the smallest size fiber optic cable. It also facilitates termination of the strength member to the retention sleeve using the method described above involving the strength member of the cable being fitted over rear portion 101 and captured by heat shrink sleeve 104, which extends to the rear of the sleeve so as to also enclose a jacket of the cable. In addition to bore 98 for receiving the precision ceramic guide 97, retention sleeve 99 includes a bore a central bore 105 extending into rear section 101 of the retention sleeve 99 and dimensioned to receive a buffer or cladding portion of the cable, and a rear bore 106 which communicates with central bore 105 and has an enlarged diameter to facilitate insertion of the stripped buffer into the retention sleeve during termination of the cable.

As in conventional guide retention sleeves or sleeves, the strength member of the cable is terminated to the exterior of the rear section. However, unlike conventional ceramic guide retention sleeves, when the strength member is fitted over the rear portion 37 of the retention sleeve 34 of the preferred embodiment of the invention, the outer diameter d of the strength member is approximately equal to that of the cable jacket, which has been stripped to a point just before the end of the sleeve. As a result, not only the strength member, but also a portion of the cable jacket can be captivated during termination to provide a more secure termination having a diameter that is less than that of the conventional crimp termination.

Although two preferred embodiments of the invention have been described with sufficient particularity to enable a person skilled in the art to make and use the invention without undue experimentation, it will be appreciated that numerous other variations and modifications of the illustrated embodiments, in addition to those already noted above, may be made by those skilled in the art. For example, any of the above-described pin and socket termini may be mated to corresponding socket or pin termini having a different construction. In addition, the fiber optic cables may be terminated to the pin and socket termini of the preferred embodiments by methods other than the one specifically described herein and, on the other hand, the method of terminating the strength member to the retention sleeves of the preferred embodiment may be used with termini having a different construction than the illustrated construction. Each of these variations and modifications, including those not specifically mentioned herein, is intended to be included within the scope of the invention, and thus the description of the invention and the illustrations thereof are not to be taken as limiting, but rather it is intended that the invention should be defined solely by the appended claims.

What is claimed is:

1. A termination arrangement for fiber optic cables, comprising:

a pin terminus and a socket terminus each including a retention sleeve and a precision guide press fit into the retention sleeve, said precision guide having a central passage for receiving an optical fiber;

wherein adjacent the retention sleeve of the socket terminus, surrounding the precision guide of the socket terminus is a washer arranged to be retained in a socket connector, a bushing press fit on the precision guide, a compression spring, and an alignment sleeve press fit on the precision guide and adjacent the bushing; and wherein said alignment sleeve extends beyond a mating face of the precision guide so as to receive the precision guide of the pin terminus, said compression spring, retention sleeve, and precision guide being arranged to be moved relative to the washer upon insertion of the precision guide of the pin terminus into the alignment sleeve.

2. A termination arrangement as claimed in claim 1, wherein the washer is a stepped washer arranged so that the step of the washer prevents a retention mechanism of the connector from being deflected beyond the elastic limit of its material.

3. A termination arrangement as claimed in claim 1, wherein each retention sleeve has a length sufficient to cause a grommet of a respective connector to always seal on a consistent diameter of the sleeve and not be cable dependent.

4. A termination arrangement as claimed in claim 1, wherein, due to the close tolerances, the frictional forces between the alignment sleeve and the precision guide of the socket terminus cause the alignment sleeve to stay on the socket terminus when the pin and socket termini are disconnected while permitting manual removal of the sleeve to access a front mating face of the guide.

5. A termination arrangement as claimed in claim 1, wherein each guide member has a long chamfer at one end which minimizes a size of a mating face of the precision guide.

6. A termination arrangement as claimed in claim 1, wherein a rear portion of both the pin and socket terminus retention sleeves are stepped down to provide an area for a section of a strength member of the fiber optic cable to be terminated to.

7. A termination arrangement as claimed in claim 6, further comprising a layer of epoxy applied to an outer diameter of the rear portion and to a fiber optic cable jacket, and a heat shrink tube brought up over the outer jacketing of the fiber optic cable to surround the layer of epoxy and shrunk down in order to cure the epoxy, captivate the strength member, and seal the shrink tube to the outer jacket.

8. A termination arrangement as claimed in claim 7, wherein the heat shrink tube is made of an at least partially transparent material so as to provide a visual indication as to when the epoxy has changed color, thereby indicating whether the epoxy is fully cured.

9. A termination arrangement for fiber optic cables, comprising:

a pin terminus and a socket terminus, wherein said pin terminus includes a retention sleeve and a precision guide press fit into the retention sleeve, said precision guide having a central passage for receiving an optical fiber, and wherein said socket terminus includes a precision guide, a retention sleeve, a bushing, an alignment sleeve, a compression spring and a washer arranged to be retained in a socket connector surrounding the retention sleeve, said bushing being press fit on the precision guide and threaded onto the retention sleeve, said alignment sleeve being press fit on the precision guide and positioned adjacent the bushing and extending beyond a mating face of the precision guide so as to receive the precision guide of the pin terminus, and said compression spring and said washer being in between the retention sleeve and the bushing, said bushing, retention sleeve, and precision guide being arranged to be, moved relative to the washer upon insertion of the precision guide of the pin terminus into the alignment sleeve.

10. A termination arrangement as claimed in claim 9, wherein the washer is a stepped washer arranged so that the step of the washer prevents a retention mechanism of the connector from being deflected beyond the elastic limit of its material.

11. A termination arrangement as claimed in claim 9, wherein each retention sleeve has a length sufficient to cause a grommet of a respective connector to always seal on a consistent diameter of the sleeve and not be cable dependent.

12. A termination arrangement as claimed in claim 9, wherein, due to the close tolerances, the frictional forces between the alignment sleeve and the precision guide of the socket terminus cause the alignment sleeve to stay on the socket terminus when the pin and socket termini are disconnected while permitting manual removal of the sleeve to access a front mating face of the guide.

13. A termination arrangement as claimed in claim 9, wherein each guide member has a long chamfer at one end which minimizes a size of a mating face of the precision guide.

14. A termination arrangement as claimed in claim 9, wherein a rear portion of both the pin and socket terminus retention sleeves are stepped downt to provide an area for a section of a strength member of the fiber optic cable to be terminated to.

15. A termination arrangement as claimed in claim 14, further comprising a layer of epoxy applied to an outer diameter of the rear portion and to a fiber optic cable jacket, and a heat shrink tube brought up over the outer jacketing of the fiber optic cable to surround the layer of epoxy and shrunk down in order to cure the epoxy, captivate the strength member, and seal the shrink tube to the outer jacket.

16. A termination arrangement as claimed in claim 15, wherein the heat shrink tube is made of an at least partially transparent material so as to provide a visual indication as to when the epoxy has changed color, thereby indicating whether the epoxy is fully cured.

* * * * *